United States Patent [19]
Bjarnason et al.

[11] Patent Number: 5,914,982
[45] Date of Patent: Jun. 22, 1999

[54] METHOD AND APPARATUS FOR TRAINING LINEAR EQUALIZERS IN A PCM MODEM

[75] Inventors: Elias Bjarnason; Olafur Jonsson, both of Reykjavik; Sverrir Olafsson, Seltjarnarnes, all of Iceland

[73] Assignee: Rockwell Semiconductor Systems, Inc., Newport Beach, Calif.

[21] Appl. No.: 08/874,316

[22] Filed: Jun. 13, 1997

[51] Int. Cl.$^6$ .................................. H04B 1/38; H04L 5/16
[52] U.S. Cl. ........................ 375/222; 375/231; 375/233; 375/295
[58] Field of Search .................................... 375/222, 231, 375/323, 233, 240, 241, 295

[56] References Cited

U.S. PATENT DOCUMENTS

| | | | |
|---|---|---|---|
| 4,489,416 | 12/1984 | Stuart ....................................... | 375/233 |
| 4,995,057 | 2/1991 | Chung ..................................... | 375/233 |
| 5,463,661 | 10/1995 | John et al. .............................. | 375/222 |
| 5,661,718 | 8/1997 | Bremer et al. . | |
| 5,666,378 | 9/1997 | Marchetto et al. . | |
| 5,677,951 | 10/1997 | Gay . | |
| 5,694,423 | 12/1997 | Larsson et al. ......................... | 375/231 |
| 5,706,344 | 1/1998 | Finn . | |
| 5,721,772 | 2/1998 | Haneda et al. . | |
| 5,732,112 | 3/1998 | Langberg ................................ | 375/349 |
| 5,737,389 | 4/1998 | Allen . | |
| 5,737,410 | 4/1998 | Vähätalo et al. . | |
| 5,740,242 | 4/1998 | Hayashi . | |
| 5,761,088 | 6/1998 | Hulyalker et al. . | |
| 5,764,694 | 6/1998 | Rahamim . | |
| 5,809,075 | 9/1998 | Townshend ............................. | 375/254 |

*Primary Examiner*—Chi H. Pham
*Assistant Examiner*—Emmanuel Bayard
*Attorney, Agent, or Firm*—Phillip K. Yu

[57] ABSTRACT

A pulse code modulation (PCM) modem system employs a relatively white training signal to optimize the adaptive filter coefficients in the receiver equalizers. During the training mode, any line coding or equivalent spectral shaping is disabled to provide a training signal sequence having a substantially even spectral content. The presence of DC within the training signal reduces the likelihood that the error function of the equalizers will settle at a local minimum. Following the training interval, the encoder enables the line coder to condition the digital input sequences, introduce DC nulls, and reduce the detrimental effects of baseline wander.

11 Claims, 3 Drawing Sheets

METHOD AND APPARATUS FOR TRAINING LINEAR EQUALIZERS IN A PCM MODEM

FIELD OF THE INVENTION

The present invention relates generally to adaptive linear equalizers employed in a pulse code modulation (PCM) modem application. More specifically, the present invention relates to an apparatus for training an adaptive linear equalizer where a DC null is normally present in the channel as well as in the transmitted data signals.

BACKGROUND OF THE INVENTION

A number of modem devices and their associated data communication protocols are well known in the prior art. The rapid increase in internet access and the undesirably long downloading times typically associated with current internet use has spawned the development of new high speed modems that can transmit data files at theoretical speeds of up to 56 kilobits per second (kbps). The typical 56 kbps solution combines pulse code modulation (PCM) techniques with several existing features set forth in the standard V.34 data communications protocol. Although such a solution can lead to an increased data rate, the "combined" technology can present several technical problems that require consideration. Some of these problems are addressed in the following United States patent applications, which are incorporated herein by reference: "Spectral Shaping in Signal-Point Limited Transmission System," Ser. No. 08/746,731, filed Nov. 15, 1996; "System for Controlling and Shaping the Spectrum and Redundancy of Signal-Point Limited Transmission," Ser. No. 08/756,383; and "Method and Apparatus for Implementing Shell Mapping Techniques in the Context of a PCM-based Modem Communications System," Ser. No. 08/760,646, filed Dec. 4, 1996.

Linear equalizers are adaptive filters that are routinely utilized to compensate for intersymbol interference (ISI), which is a common practical impairment found in many transmission systems, e.g, voiceband and digital data modems. The severity of ISI depends upon the characteristics of the particular communication channel. For example, most data communication and modem systems use a single channel to transmit several symbols in succession. Unfortunately, an inherent effect of most communication channels is that a received message or symbol can be corrupted with interference from a neighboring (with respect to time) message or symbol. For a more detailed treatment of adaptive filters, see Simon Haykin, ADAPTIVE FILTER THEORY, ch. 4, 5, 8, and 9 (3d ed., Prentice Hall 1996), the subject matter of which is incorporated by reference herein.

Since ISI can be modeled as a linear pulse spread in time, it can be compensated for by a linear filter which "inverts" the pulse spreading by detecting the content of each message spread over time at the receiver. ISI can also be considered in the frequency domain; if a signal is subject to an uneven frequency attenuation, then ISI is introduced. Viewed in this manner, the equalizer corrects for the uneven frequency response by making the combined channel and equalizer response as flat as possible.

Adaptive linear equalizers may be subjected to training procedures that seek to optimize the equalizer transfer functions prior to the transmission of the actual data. Typically, equalizer training is accomplished by transmitting a known data sequence to the receiver, which utilizes the same data sequence as an input to an adaptation circuit. A correction signal may be used to adjust one or more filter taps resident in the linear equalizers.

In baseband systems, such as PCM modems, AC coupling inherent in the transmission channel can cause a form of ISI known as baseline wander. Baseline wander is proportional to the running digital sum (RDS) of the line code employed by the transmission system. Accordingly, conventional PCM modems often utilize line codes that minimize or regulate the upper limit of the RDS, thus controlling the detrimental effects of baseline wander. Such line codes tend to color the spectrum of the transmitted signal by reducing the DC content of the transmitted signal. For a general discussion of spectral control techniques, line codes, and related filtering, see Edward A. Lee & David G. Messerschmitt, DIGITAL COMMUNICATION, ch. 12 (2d ed., Kluwer Academic Publishers 1994), the subject matter of which is incorporated by reference herein.

Unfortunately, the use of line codes may adversely affect the performance of the linear equalizers employed by the receive modem. For example, the use of a colored training signal in a receiver that utilizes a decision feedback equalizer (DFE) may cause the DFE to settle at a local, rather than the global, minimum with respect to the optimum settings of the associated filter taps. In addition, a colored training signal generally results in smaller eigenvalues in the receive signal autocorrelation matrix. Accordingly, the use of a colored training signal, e.g., a training signal subject to line coding, can result in poorly adjusted linear equalizers at the modem receiver. Less than optimum initial settings can adversely affect the performance of the modem during actual data transmission.

SUMMARY OF THE INVENTION

Accordingly, it is an advantage of the present invention that an improved training procedure for a PCM modem is provided.

Another advantage of the present invention is that an adaptive linear equalizer can be suitably optimized during a training procedure while maintaining an adequate reduction in baseline wander in a PCM modem during data transmission.

A further advantage is that the present invention employs a training sequence having a substantially even spectrum that provides excitation to the linear equalizer at or near DC.

The above and other advantages of the present invention are carried out in one form by a training method for use with a PCM modem system. The method involves initializing a training mode between a PCM transmitter modem configured to transmit colored transmit signals during a transmit mode and a PCM receiver modem configured to receive and process the colored transmit signals during a receive mode, transmitting a predetermined training sequence from the PCM transmitter modem to the PCM receiver modem during the training mode, adaptively adjusting the transfer function of at least one equalizer resident at the PCM receiver modem during the training mode, and switching the PCM transmit modem from the training mode to the transmit mode. In a preferred embodiment, the training sequence exhibits a less-colored spectrum, relative to the colored transmit signals, over a limited bandwidth.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF THE PREFERRED EMBODIMENT

Figure 1:
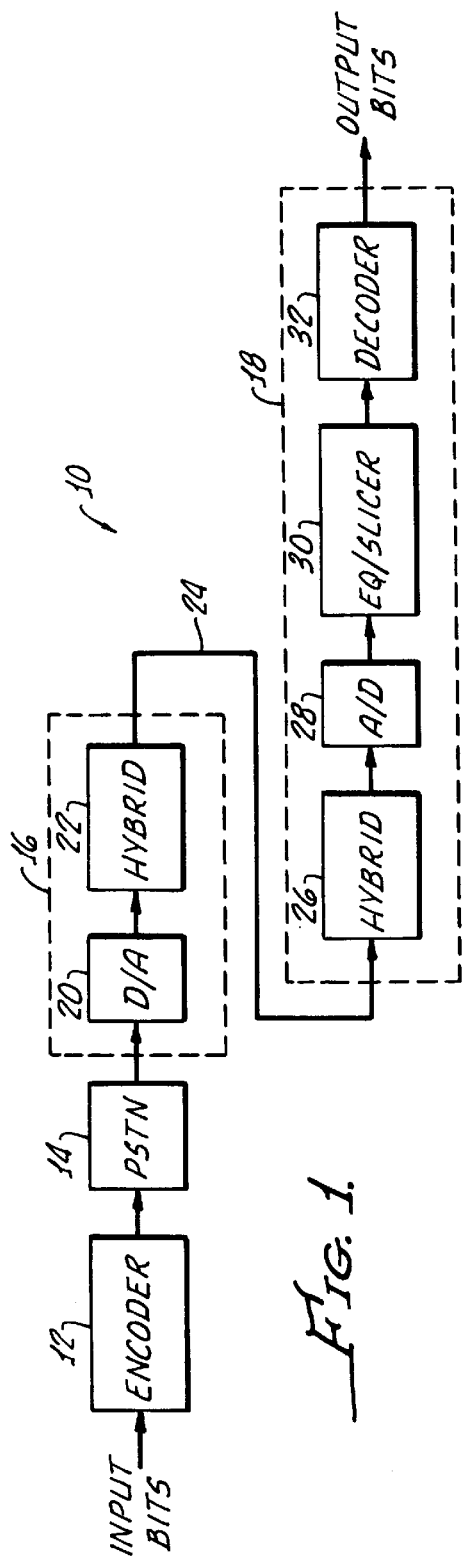
FIG. 1 is a block diagram representation of an exemplary PCM modem environment in which the present invention may operate.

FIG. 1 depicts an exemplary PCM environment in which a preferred embodiment of the present invention may operate. Those skilled in the art will appreciate that although FIG. 1 only illustrates a downstream data transmission path, a complete PCM environment may include any number of downstream channels, and any number of cooperating upstream channels. Furthermore, for the sake of clarity, conventional PCM and other operating elements are not shown or described herein. An exemplary PCM data transmission system 10 generally includes an encoder 12, which may be located at an internet service provider (ISP), a public switched telephone network (PSTN) 14, a central office 16, and a user modem 18. Encoder 12 is described in more detail below.

Current modem theory assumes that PSTN 14 is a fully digital network capable of receiving and transmitting digital data from encoder 12; this realization opens the path toward downstream data rates of up to 56 kbps. Central office 16 typically includes a D/A converter 20 and a hybrid 22 for coupling the transmitter to the local loop transmission media 24. The analog signal transmitted over transmission media 24 is eventually received by modem 18 and coupled to receiver components (not shown) via hybrid 26. Modem 18 may also include an A/D converter 28 having an output connected to an equalizer/slicer block 30. Equalizer/slicer block 30 will be described in more detail below. The output of equalizer/slicer block 30 is preferably configured as a series of discrete amplitudes, each representing a u-law signal point. Decoder 32 reverses the role of encoder 12 to map the discrete amplitudes into corresponding digital bits that (ideally) represent the digital data processed by encoder 12.

Figure 2:
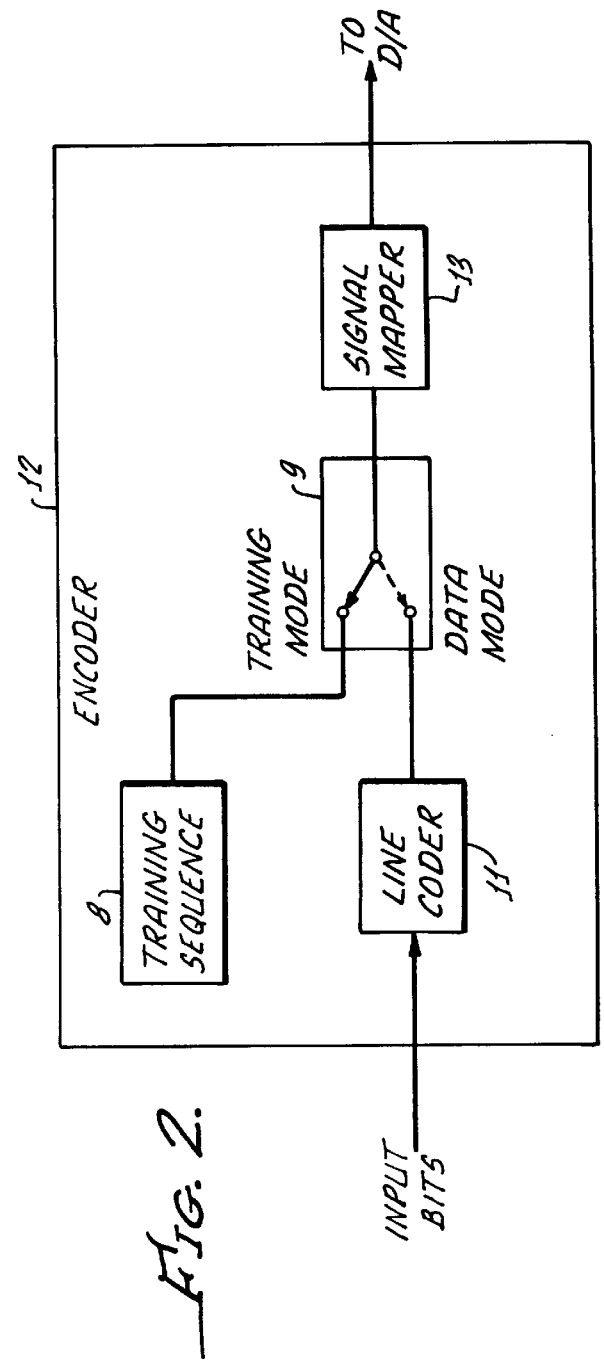
FIG. 2 is a block diagram representation of the encoder shown in FIG. 1.

FIG. 2 is a more detailed representation of encoder 12, which may be an integral element of a transmit modem (not shown). Those skilled in the art will appreciate that the individual elements of encoder 12 may be realized by any number of discrete semiconductor chips and/or processing elements carried out by software instructions contained in a suitable microprocessor. Of course, encoder 12 may include additional elements known to those skilled in the art; such elements are not shown or described herein. Encoder 12 preferably includes at least a logic circuit 8 for generating a predetermined training sequence, a line coder 11, a switch element 9, and a signal mapper 13. Signal mapper 13 receives an input sequence of digital information and maps the input sequence into a signal point sequence having magnitudes selected from a signal point constellation compatible with PSTN 14. Switch element 9 selects an output from either line coder 11 or logic circuit 8, depending upon whether the transmit modem is operating in a data mode or a training mode, respectively. It should be noted that the present invention may utilize any suitable device for selecting between these two input sources.

Line coder 11 is one example of a means for shaping the spectrum of a PCM transmit signal. Alternatively, any number of suitable spectral shaping techniques may be utilized in encoder 12. Line coder 11 adds redundant bits to the sequence of input bits to reduce spectral components near DC. In the exemplary embodiment shown in FIG. 2, line coder 11 utilizes past outputs from signal mapper 13 to determine the redundant bits. The particular form of line coding and the amount of DC suppression may vary from application to application. Line coding has traditionally been utilized in a modem context to reduce the negative effect of baseline wander. In the preferred embodiment, switch element 9 communicates with line coder 11 in the data mode, during which data is transmitted to modem 18.

The training sequence generated by logic circuit 8 is preferably configured such that the equalizers in equalizer/slicer block 30 can be optimized (described below). To this end, the training sequence is preferably characterized by a substantially white spectrum over the particular transmitting bandwidth. In other words, the training sequence is configured to have a substantially even frequency spectrum, including energy present at or near DC. This spectral characteristic reduces the likelihood that the equalizer taps will settle to less than optimum values. The use of a less-colored training sequence, relative to the transmitted data signals, balances the need for equalizer optimization with the reduction of baseline wander, which typically requires the addition of a DC null into the transmit signals. In the context of this specification, a "white" signal means a signal having a substantially even or flat spectrum over the desired bandwidth and a "colored" signal means a signal lacking spectral content at one or more frequencies in the desired bandwidth.

It should be appreciated that the benefits of the present invention may be realized by a training signal that merely includes less DC suppression than that exhibited by a normal transmit signal. In other words, adequate equalizer training may be obtained even if the training signal has some attenuation at or near DC (or at other frequencies within the subject frequency band). Such attenuation may be introduced by applying a weak line code to the training signal or by formatting the training signal to emulate a weak line code having some amount of DC suppression.

In an alternate embodiment, the training signal may be configured such that a first portion of the sequence is substantially white and a second portion of the sequence is colored. For example, the second portion of the training sequence may be configured to emulate a transmit sequence subjected to line coder 11. Such "two-stage" training may be desirable to enable PCM system 10 to easily transition from the training mode to the data mode. It should be noted that the training signal need not be limited to any specific sequence of bits; optimization of the receiver equalizers depends more on the spectrum of the training sequence rather than the actual data conveyed by the training sequence.

Figure 3:
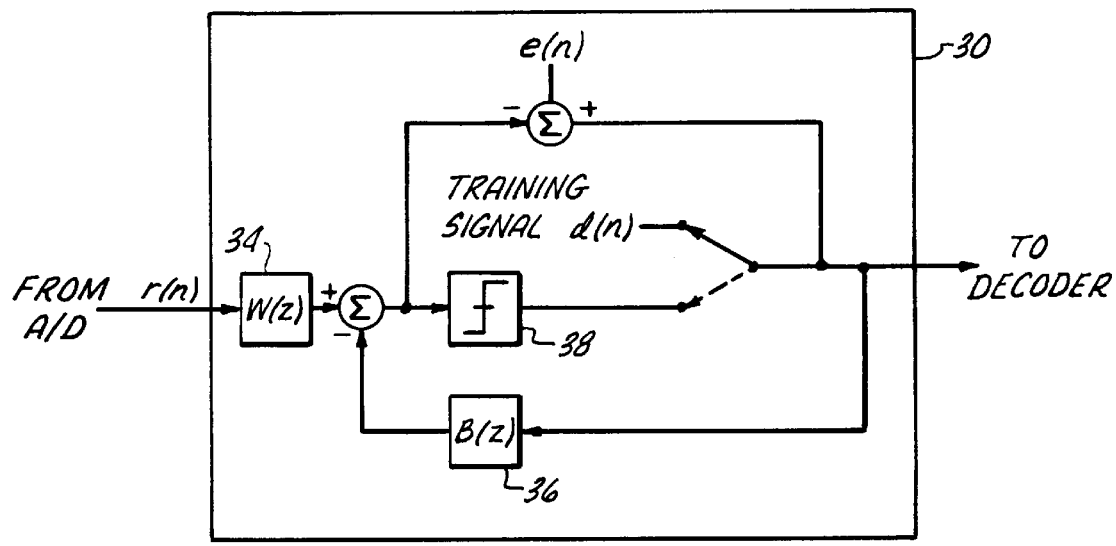
FIG. 3 is a block diagram representation of a portion of a PCM receiver including two linear equalizers.

Referring now to FIG. 3, equalizer/slicer block 30 is illustrated in more detail. It should be appreciated that FIG. 3 shows an exemplary configuration of equalizer/slicer block 30; in practice, equalizer/slicer block 30 may include additional components known in the art. Equalizer/slicer block 30 may include a feed-forward equalizer 34, a feedback equalizer 36, and a slicer 38. In the preferred embodiment, a predetermined training sequence d(n) formed from a pseudorandom sequence of symbols is applied to the input of feedback equalizer 36 during a training interval that precedes the transmission of digital data. As described above in connection with FIG. 2, the training sequence is preferably the same as that generated by encoder 12.

During the training interval, the coefficients of feed-forward equalizer 34 and/or feedback equalizer 36 are adjusted according to known processes to minimize the error squared function associated with feed-forward equalizer 34 and feedback equalizer 36. Following the training interval, the filter taps of equalizers 34 and 36 are ideally optimized and further processing and updating is performed during the data mode to recalculate the associated error and further adjust the filter coefficients to compensate for continuous changes in channel characteristics. In the preferred embodiment, any updating subsequent to the initial training period is performed at a slower rate, i.e., the step size coefficients of the relevant update algorithms are reduced.

As shown in FIG. 3, feedback equalizer 36 monitors past decisions (or known symbols) to estimate their contribution to the ISI present in the current symbol. This estimated contribution is subtracted from the output of feed-forward equalizer 34 before the next decision is made. Although feedback equalizer 36 is desirable to reduce ISI from past symbols, it may introduce propagated errors to the system via the feedback loop. Such propagated errors may cause modem 18 to function in a wholly improper manner.

Unlike feedback equalizer 36, feed-forward equalizer 34 is not a source of error propagation. Error decisions are not performed or utilized by feed-forward equalizer 34, thus a coding technique with delay, e.g., Trellis coding, may be implemented. Unfortunately, noise enhancing can be problematic with respect to feed-forward equalizer 34 because sharp spectral nulls present in the transmit channel of PCM system 10 may cause a peak in the equalizer response at that frequency location, which enhances the noise in that particular band.

Figure 4:
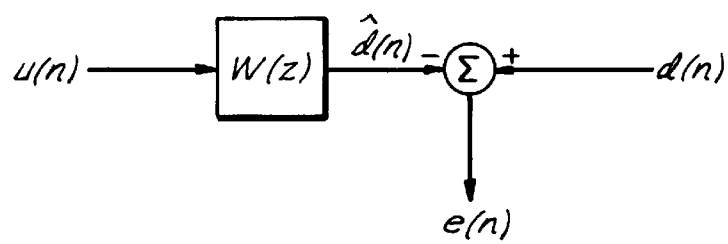
FIG. 4 is a block diagram representation of a basic feed-forward equalizer.

FIG. 4 is a block diagram representation of feed-forward equalizer 34. Feed-forward equalizer 34 may be represented by the following relationship:

$$W(z) = \sum_{k=0}^{N-1} w_k z^{-k}$$

As described above, the equalizer taps are preferably adjusted to minimize the error associated with the particular equalizer. Those skilled in the art will recognize that the tap-weight vector w(n) may be visualized as a bowl-shaped surface having a unique minimum. An ideal adaptive equalizer continuously adjusts the equalizer coefficients in an attempt to reach the global minimum of this surface. With respect to a decision feedback equalizer (such as feedback equalizer 36), the error performance surface may be characterized by several local minimums rather than one unique minimum. Accordingly, an effective adaptive feedback equalizer should continue to update its filter taps rather than settle at a local minimum.

The optimum set of coefficients, $w_o$, may be found using the optimization method known as the method of steepest descent. The method of steepest descent involves the following steps:

(1) assuming an initial value w(0) of the tap-weight vector;

(2) applying w(0) to calculate the complex gradient vector of the error squared function J(n) with respect to the real and imaginary parts of w(n);

(3) updating w(n) by making a change in the current estimate in a direction opposite to that of the gradient vector; and (4) repeating steps (2) and (3) to optimize w(n).

The above steps are equivalent to the following update algorithm, where $\mu$ is the step size coefficient:

$$w(n+1) = w(n) + \mu E[u(n)e^*(n)];$$

$$u(n) = [u(n), u(n-1), \ldots, u(n-N+1)]^T.$$

In a typical application, real-time estimates are employed rather than the real $E[u(n)e^*(n)]$ component. Accordingly, the above relationships may be used to derive the well known LMS algorithm:

$$w(n+1) = w(n) + \mu u(n)e^*(n);$$

$$u(n) = [u(n), u(n-1), \ldots, u(n-N+1)]^T.$$

Considering the LMS algorithm, the update equations for feed-forward equalizer 34 and feedback equalizer 36 may be set forth:

$$w_k(n+1) = w_k(n) + \mu r(n-k)e(n); \quad k=0, \ldots, N_{FF}-1$$

$$b_k(n+1) = b_k(n) - \mu d(n-k)e(n); \quad k=1, \ldots, N_{FB}$$

During the initial training period, the step size $\mu$ is periodically decreased; when modem 18 switches to a data receive mode, it further decreases the value of the step size $\mu$. Thus, subsequent updating of feed-forward equalizer 34 and feedback equalizer 36 is performed in a gradual manner.

The use of hybrid 22 to implement the AC coupled transmission channel results in the output waveform having a zero average value. Furthermore, depending upon the configuration of the transmitted symbols, the AC coupling may be the cause of another form of ISI commonly known as baseline or DC wander. As discussed above, the prior art has addressed this problem related to baseline wander by employing a line code that will keep the RDS (Running digital sum) bounded. This technique ensures that the RDS and the DC wander remains bounded; the associated ISI is regulated in this manner. However, the prior art approach does not contemplate the adverse affects that such line codes may have on the training of the receiver equalizers.

The relationship between the spectrum of the training signal and the optimization of feed-forward equalizer 34 may be described with continued reference to FIG. 3. Assuming that R is the N×N correlation matrix of the input values and p denotes the N×1 cross-correlation vector between the inputs and the desired response, then:

$$R = E[u(n)u^H(n)];$$

$$p = E[u(n)d^*(n)]; \text{ and}$$

$$u(n) = [u(n), u(n-1), \ldots, u(n-N+1)]^T.$$

The optimum set of filter taps for feed-forward equalizer 34 satisfies the following relationship: $Rw_0 = p$. A basic formulation of perturbation theory states that if the matrix R and the vector p are perturbed by a small amount R and p, respectively, and if R/R and p/p are both on the order of some and <<1, then w/w (R), where w is the change produced in w, and (R) is the condition number of the matrix R with respect to inversion. The condition number is so called because it describes the ill condition or bad behavior of matrix R quantitatively. Specifically, the condition matrix is defined as: $(R) = R \, R^{-1}$, where R is the norm of the matrix R. There are several ways of defining the norm R but it is common in adaptive filter theory to use the spectral norm defined as: $R_s = (\text{largest eigenvalue of } R^H R)^{1/2}$. Now it can be shown that $R_s = \lambda_{max}$, and $R^{-1}{}_s = 1/\lambda_{min}$. This ratio is commonly referred to as the eigenvalue spread or the eigenvalue ratio of the correlation matrix. Note that (R) 1 and for white input sequences (R) is close to 1. On the other hand, for colored input sequences such as transmit signals having a DC null, (R) becomes large and the corresponding correlation matrix R is not adequately conditioned. This behavior may cause problems in solving a system of equations involving $R^{-1}$.

Thus, small perturbations in R and p result in much large perturbation in w. In practice this relates to high variance in the equalizer taps w, i.e., they fail to settle to optimum value and performance degrades.

Referring back to FIG. 1, the AC coupling performed by the transformer in hybrid 22 causes the channel to have a spectral null at or around DC. As such, it is difficult, if not impossible, to obtain a white signal at modem 18 during the training interval. The lack of DC caused by transformer coupling colors the transmit signal spectrum.

In prior art systems, additional attenuation in the received signal near DC may be caused by the use of a line code (employed to reduce baseline wander effects). Accordingly, a signal having no line code (or a relatively weaker line code) provides the strongest signal near DC at modem 18. Such DC excitation of feed-forward equalizer 34 and feed-back equalizer 36 is desirable for effective training (as described above). Although such DC stimulation may appear counterintuitive, the temporary excitation during the training interval can more than compensate for the negative side effects related to baseline wander and nonlinearities. As described above, if a colored training signal is employed, then feedback equalizer 36 may settle at a local minimum, rather than the global minimum, of the error performance surface of the equalizer.

Figure 5:
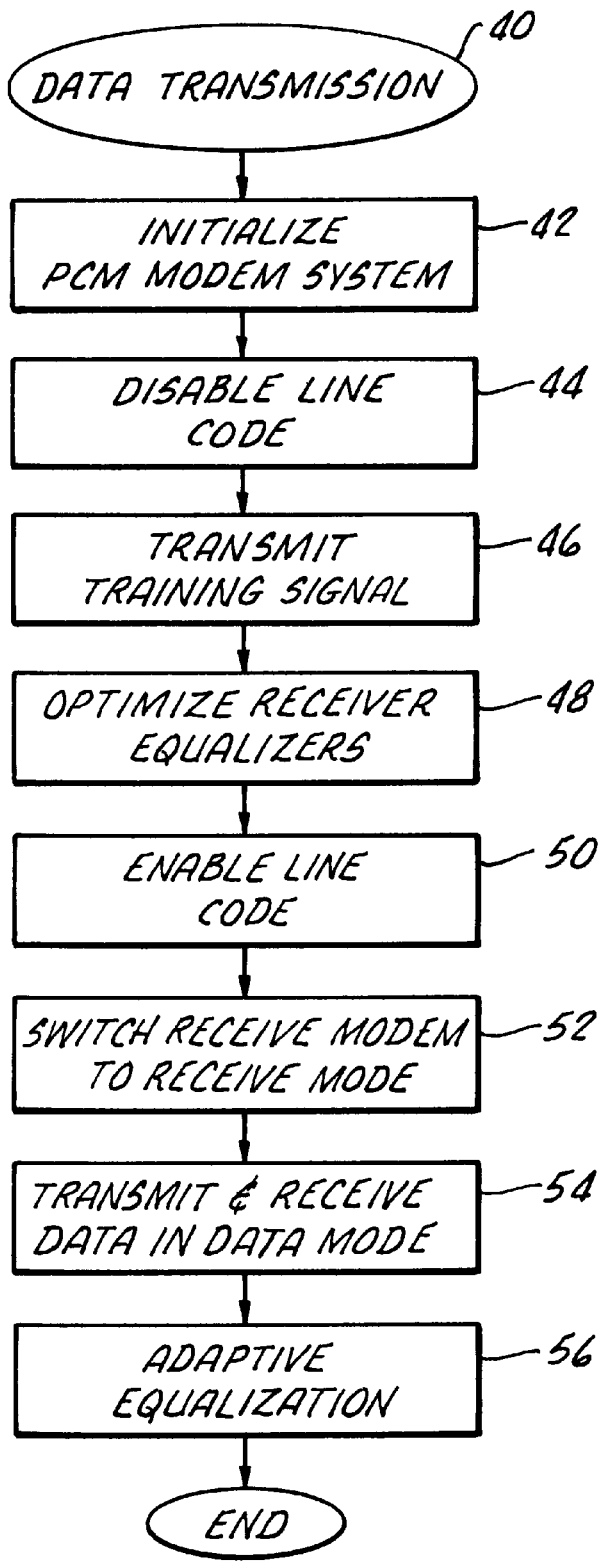
FIG. 5 is a flow diagram of a data transmission process carried out by a PCM modem system.

With reference to FIG. 5, an exemplary data transmission process 40 in accordance with the preferred embodiment of the present invention is illustrated. Process 40 may begin with a task 42, which initializes PCM system 10. During task 42, the ISP modem (of which encoder 12 may be an integral component) may establish initial communication with modem 18. It should be noted that task 42 may involve conventional handshaking techniques and signaling protocols known to those skilled in the art. Following task 42, process 40 may lead to a task 44, which causes encoder 12 (or any suitable control element within the transmit portion of the ISP modem) to temporarily disable line coder 11, which is normally employed during data transmission. In the preferred embodiment, task 44 may be accomplished by causing switching element 9 to switch to the training mode (see FIG. 2).

In accordance with an alternate embodiment of the present invention, task 44 may instead cause encoder 12 to utilize a secondary line code (not shown) that causes the training signal to have greater spectral content at DC than the line code utilized during the normal data transmit mode. In other words, the benefits of the present invention may be realized by changing the line code to increase or decrease spectral components at or near DC without completely disabling line coder 11. Furthermore, those skilled in the art should appreciate that any spectral shaping methodology (other than line coding) may be implemented by the particular PCM application. Accordingly, the present invention may be alternatively configured to suppress or disable any applicable spectral shaping feature in addition to (or instead of) line codes.

Following task 44, a task 46 is performed to transmit the encoded training signal to modem 18. Preferably, the spectrum of the training signal includes DC content and "even" spectral shaping over the entire applicable bandwidth. Of course, an ideally white signal may not be achievable in view of practical limitations of the physical components and/or the electrical characteristics of the transmit channel. Nonetheless, the training signal is configured to adequately excite feed-forward equalizer 34 and feedback equalizer 36 at frequencies near DC. The precise sequence of data transmitted during the training interval is not critical to the successful optimization of equalizers 34 and 36. Rather, the spectral content and DC energy of the training sequence is determined under the assumption that little or no spectral shaping will be employed during the training interval.

During the training interval, a task 48 is performed at modem 18 to optimize equalizers 34 and 36. As described above, task 48 compares past symbols and decisions to generate a suitable error signal that controls the adjustment of the associated filter taps. In an exemplary embodiment, 32,000 symbols are transmitted during the training interval. According to current standards, 8,000 symbols are transmitted through PSTN 14 each second. Thus, the current preferred training interval is 4.0 seconds. Conventional handshaking protocols ensure that the ISP modem and modem 18 operate in a synchronous manner such that they effectively cooperate during the training interval. Due to the limited period during which equalizers 34 and 36 are subject to the training signal, total optimization may not be obtainable. However, the adaptive nature of equalizers 34 and 36 provide for continuous updating even after the training interval lapses.

When the filter taps of feed-forward equalizer 34 have been optimized, the product of the input signal associated with feed-forward equalizer 34 and the error e(n) should be almost white (see FIGS. 3 and 4). Unfortunately, this does not occur when the spectrum of the reference training signal is colored. Accordingly, configuring the reference training signal to be as white as possible during training aids equalizers 34 and 36 in obtaining their global minimums.

Following task 48, a task 50 causes encoder 12 to enable line coder 11 (or any suitable spectral shaping component) for use during normal data transmission. As described above, switch element 9 preferably switches to the data mode during task 50. However, the enabling/disabling of the line code feature may be realized through any number of known switching or control techniques. In addition to task 50, a task 52 may cause modem 18 to switch from the training mode to a normal receive mode. For example, as shown in FIG. 3, equalizer/slicer block 30 may switch from the internal training signal d(n) to the output of slicer 38. Following tasks 50 and 52, PCM system 10 is preferably in a condition to transmit and receive data.

During task 54, encoded and processed data symbols are transmitted over transmission media 24 according to the protocols implemented by PCM system 10. The transmitted data symbols are preferably subjected to line coding to reduce the adverse effects of baseline wander; in other words, the transmit signal may have DC nulls or otherwise have a colored spectrum. Modem 18 receives, equalizes, and decodes the data symbols according to the particular protocols used by PCM system 10. Ideally, the training mode has adequately conditioned feed-forward equalizer 34 and feedback equalizer 36 such that data errors are minimized or at least tolerable for purposes of establishing initial data transfer.

A task 56 occurs in a continuous or periodic manner during the data mode. During task 56, modem 18 performs adaptive equalization as described above. In response to the shift from the training mode to the data mode, modem 18 preferably reduces the step size coefficients in the equalizer update algorithm to slow the adaptive response of equalizers 34 and 36. Those skilled in the art should recognize that any number of adaptive equalization techniques may be implemented in the present invention; such known techniques will not be described in detail herein. Following task 56, data transmission process 40 ends.

In summary, the present invention provides an improved training procedure for a PCM modem system. Adaptive linear equalizers employed by the PCM modem system can be suitably optimized during a training procedure while the PCM modem system maintains an adequate reduction in baseline wander during data transmission. The training sequence preferably has an even spectrum that provides excitation to the linear equalizer at or near DC to better optimize the equalizer coefficients.

The present invention has been described above with reference to a preferred embodiment. However, those skilled in the art will recognize that changes and modifications may be made to the preferred embodiment without departing from the scope of the present invention. For example, the block diagram representations are used for illustrative purposes, and any practical realization of a PCM modem system will necessarily be more complex. In addition, the processes described herein may be embedded in a larger processing environment, and some of the process tasks set forth herein may be performed in a different order or eliminated in certain applications. These and other changes or modifications are intended to be included within the scope of the present invention, as expressed in the following claims.

What is claimed is:

1. A method for transmitting data in a pulse code modulation (PCM) modem system, said method comprising the steps of:

initializing a training mode characterized by a training interval;

adjusting spectral shaping in a transmit modem during at least a portion of said training interval to thereby reduce color in the spectrum of transmit signals, relative to signals transmitted by said transmit modem during a normal data mode, wherein said adjusting step comprises the step of decreasing the number of redundancy bits associated with said line coder;

transmitting a predetermined training sequence from said transmit modem during said training interval;

readjusting spectral shaping in said transmit modem to thereby increase color in the spectrum of signals transmitted after said training interval, relative to signals transmitted by said transmit modem during said training interval, wherein said readjusting step comprises the step of increasing the number of redundancy bits associated with said line coder; and transmitting data symbols in accordance with a PCM protocol.

2. A method according to claim 1, further comprising the step of adaptively adjusting at least one equalizer located in a receive modem in response to said training sequence.

3. A method according to claim 1, wherein said training sequence is characterized by a substantially white spectrum over a predetermined bandwidth.

4. A training method for use with a pulse code modulation (PCM) modem system, said method comprising the steps of:

initializing a training mode for a PCM transmitter modem configured to transmit colored transmit signals during a data mode and a PCM receiver modem configured to receive and process said colored transmit signals during said data mode;

transmitting a predetermined training sequence from said PCM transmitter modem to said PCM receiver modem during said training mode, said training sequence having a less-colored spectrum, relative to said colored transmit signals, over a limited bandwidth, wherein the spectrum of said training sequence is characterized by a reduction in DC suppression relative to said transmit signal;

adaptively adjusting the transfer function of at least one equalizer resident at said PCM receiver modem during said training mode; and switching said PCM transmit modem from said training mode to said data mode following said training mode.

5. A pulse code modulation (PCM) comprising:

means for shaping the spectrum of a PCM transmit signal, said means for shaping reducing spectral components near DC in said PCM transmit signal;

a logic circuit element configured to generate a predetermined training sequence having at least a first portion characterized by a substantially white spectrum over a predetermined bandwidth, wherein said predetermined training signal includes a second portion characterized by a colored spectrum over said predetermined bandwidth, relative to the spectrum of said first portion;

means for selecting an output from one of said means for shaping and said logic circuit element; wherein said means for selecting selects output associated with said logic circuit element during a training mode; and said means for selecting selects output associated with said means for shaping during a data mode.

6. A PCM modem according to claim 5, wherein said means for shaping comprises a line coder.

7. A PCM modem according to claim 5, wherein said transmit signal exhibits spectral nulls near DC caused by said means for shaping.

8. A PCM modem according to claim 5, wherein said second portion is configured such that the spectrum of said second portion includes suppressed spectral components near DC.

9. A PCM modem according to claim 5, wherein said second portion is configured such that the spectrum of said second portion emulates the spectrum of an output signal from said means for shaping.

10. A training method for use with a pulse code modulation (PCM) modem system, said method comprising the steps of:

initializing a training mode for a PCM transmitter modem configured to transmit colored transmit signals during a data mode and a PCM receiver modem configured to receive and process said colored transmit signals during said data mode;

transmitting a predetermined training sequence from said PCM transmitter modem to said PCM receiver modem during said training mode, said training sequence having a less-colored spectrum, relative to said colored transmit signals, over a limited bandwidth, wherein said transmitting step comprises the steps of transmitting a first portion of said predetermined training sequence having relatively white spectral characteristics within said limited bandwidth and transmitting a second portion of said predetermined training sequence having relatively colored spectral characteristics within said limited bandwidth, said second portion being transmitted after said first portion;

adaptively adjusting the transfer function of at least one equalizer resident at said PCM receiver modem during said training mode; and switching said PCM transmit modem from said training mode to said data mode following said training mode.

11. A method according to claim 10, wherein said second portion of said predetermined training sequence is configured to emulate the spectrum of said colored transmit signals.

* * * * *